United States Patent
Fukumoto et al.

(10) Patent No.: US 9,853,508 B2
(45) Date of Patent: Dec. 26, 2017

(54) SYNCHRONOUS RELUCTANCE MOTOR AND ROTOR FOR SYNCHRONOUS RELUCTANCE MOTOR

(71) Applicant: Kabushiki Kaisha Toshiba, Minato-ku (JP)

(72) Inventors: Syou Fukumoto, Tokyo (JP); Koji Ooishi, Tokyo (JP); Makoto Matsushita, Fuchu (JP); Daisuke Misu, Tama (JP); Katsutoku Takeuchi, Kawasaki (JP); Yutaka Hashiba, Yokosuka (JP); Norio Takahashi, Yokohama (JP); Kazuaki Yuuki, Tokorozawa (JP); Toshio Hasebe, Hachioji (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 281 days.

(21) Appl. No.: 14/779,263

(22) PCT Filed: Mar. 27, 2014

(86) PCT No.: PCT/JP2014/001762
§ 371 (c)(1),
(2) Date: Sep. 22, 2015

(87) PCT Pub. No.: WO2014/156158
PCT Pub. Date: Oct. 2, 2014

(65) Prior Publication Data
US 2016/0049835 A1    Feb. 18, 2016

(30) Foreign Application Priority Data
Mar. 28, 2013 (JP) .................... 2013-069006

(51) Int. Cl.
*H02K 1/24* (2006.01)
*H02K 19/10* (2006.01)
(Continued)

(52) U.S. Cl.
CPC ........... *H02K 1/246* (2013.01); *H02K 1/2706* (2013.01); *H02K 1/28* (2013.01); *H02K 19/10* (2013.01); *H02K 19/103* (2013.01)

(58) Field of Classification Search
CPC ........ H02K 1/246; H02K 1/2706; H02K 1/28; H02K 19/10; H02K 19/103
See application file for complete search history.

(56) References Cited

U.S. PATENT DOCUMENTS 2,913,607 A * 11/1959 Douglas ................ H02K 19/14
310/162
6,300,703 B1 * 10/2001 Kawano ................ H02K 1/246
310/162
(Continued)

FOREIGN PATENT DOCUMENTS

CN    102244429 A    11/2011
GB    1 347 561 A    2/1974
(Continued)

OTHER PUBLICATIONS

Combined Chinese Office Action and Search Report dated Feb. 4, 2017 in Chinese Patent Application No. 201480018261.4 (with English translation of categories of documents).
(Continued)

*Primary Examiner* — Robert W Horn
(74) *Attorney, Agent, or Firm* — Oblon, McClelland, Maier & Neustadt, L.L.P.

(57) ABSTRACT

A synchronous reluctance motor includes: a rotor shaft; a rotor core fixed to the rotor shaft and on which a plurality of flux barriers are formed; a stator core on which a plurality of
(Continued)

protruding stator teeth are formed; and multiphase armature windings of a plurality of poles wound around the plurality of stator teeth. The flux barriers include a plurality of first flux barriers formed to be spaced out in the circumferential direction from each other and extend in a radial direction, and a plurality of second flux barriers formed in each of circumferential angular regions sandwiched between the first flux barriers to form a curved surface convex toward the center of the rotation-axis and to spread and be spaced out in the circumferential direction from each other.

6 Claims, 10 Drawing Sheets (51) Int. Cl.
*H02K 1/27* (2006.01)
*H02K 1/28* (2006.01)

(56) References Cited

U.S. PATENT DOCUMENTS

| | | | |
|---|---|---|---|
| 8,749,109 B2* | 6/2014 | Lendenmann | H02K 1/246 310/162 |
| 8,912,700 B2* | 12/2014 | Iki | H02K 1/246 310/156.49 |
| 2004/0150282 A1 | 8/2004 | Murakami et al. | |
| 2005/0269888 A1 | 12/2005 | Utaka | |
| 2011/0012464 A1 | 1/2011 | Lee et al. | |
| 2013/0015727 A1 | 1/2013 | Iki | |
| 2015/0015093 A1* | 1/2015 | Gontermann | H02K 1/246 310/44 |
| 2016/0049835 A1* | 2/2016 | Fukumoto | H02K 1/246 310/46 |

FOREIGN PATENT DOCUMENTS

| | | |
|---|---|---|
| JP | 6-66277 U | 9/1994 |
| JP | 2000-197325 A | 7/2000 |
| JP | 2000-287419 A | 10/2000 |
| JP | 2006-121821 A | 5/2006 |
| JP | 2008-283775 A | 11/2008 |
| JP | 2009-194945 A | 8/2009 |
| WO | WO 2011/120564 A1 | 10/2011 |

OTHER PUBLICATIONS

Extended European Search Report dated Oct. 31, 2016 in Patent Application No. 14773170.7.
Office Action dated Dec. 1, 2015 in Japanese Patent Application No. 2013-069006 (with partial English translation).
Combined Search Report and Written Opinion dated Aug. 16, 2016 in Singaporean Patent Application No. 11201508007T.
International Search Report dated Jun. 17, 2014 in PCT/JP2014/001762 filed Mar. 27, 2014.

* cited by examiner

SYNCHRONOUS RELUCTANCE MOTOR AND ROTOR FOR SYNCHRONOUS RELUCTANCE MOTOR

TECHNICAL FIELD

The present invention relates to a synchronous reluctance motor and a rotor therefor.

BACKGROUND ART

Among known conventional synchronous electric motors are: a permanent magnet synchronous electric motor (PMSM), which includes a permanent magnet in a rotor; a synchronous electric motor which includes field coils in a rotor (FCSM: Field Coil Synchronous Motor); and a reluctance motor (RN), which includes magnetic salient poles in a rotor.

A PMSM has no power loss in magnetic creation and is high in efficiency. However, field-weakening control needs to be performed at the time of high-speed rotation. Moreover, there are problems related to the mechanical strength and thermal durability of the permanent magnet An RM, or a motor without any permanent magnet, has gained attention because of the problems associated with the PMSMs and a surge in the prices of magnets. As the RM, a synchronous reluctance motor (SynRM), which rotates in synchronization with a sine wave rotating field, a switched reluctance motor (SRM), which is rotated by a switching field, and the like have been known. The SynRM is known to be lower in noise and vibration than the SRM.

As for a rotor of the SynRM, the direction of a main magnetic flux is referred to as q-axis, and a direction that is electrically and magnetically orthogonal to that direction is referred to as d-axis. The rotor of the SynRM has, for example, five layers of flux barriers (slits) within a region between two q-axes whose electrical angles are, for example, $\pi$ (180 degrees) apart each other.

Accordingly, the d-axis direction inductance of the rotor, or d-axis inductance Ld, is smaller than q-axis direction inductance, or q-axis inductance Lq. As a result, the reluctance torque ($=(Ld-Lq) \cdot Id \cdot Iq$) can be increased. Here, Id is a current that creates a d-axis direction magnetic flux, and Iq is a current that creates a q-axis direction magnetic flux.

In another example of the configuration of the rotor of the SynRM, concave grooves are provided near a d-axis on an outer peripheral surface of a rotor core, and a rotor coil is wound around the concave grooves. As DC current flows through the rotor coil, the torque is generated by current flux $\Phi$i in addition to the reluctance torque.

The concave grooves are provided near the d-axis, which is defined as described above. Therefore, it is possible to prevent a decrease in the reluctance torque. As a result, it is possible to improve the torque and the efficiency.

PRIOR ART DOCUMENTS

Patent Documents

Patent Document 1: Japanese Patent Application Laid-Open Publication No. 2006-121821
Patent Document 2: Japanese Patent Application Laid-Open Publication No. 2009-194945

SUMMARY OF THE INVENTION

Problems to be Solved by the Invention

However, according to the configuration of the rotor of the SynRM, layers of flux barriers that are large in magnetic resistance need to be disposed to increase a salient pole ratio (Lq/Ld) in order to increase the torque and the power factor.

According to the configuration of the conventional SynRM, in its structure, the width of a magnetic path on the side of an upper layer (or in a radial-direction outer-side portion perpendicular to the axis of the rotor) of multi-layered magnetic paths is relatively narrow. Accordingly, the problem is that a large magnetic resistance occurs locally, leading to a decrease in the q-axis inductance (Lq) of the entire rotor and resulting in a drop in the torque and the power factor.

The present invention has been made to solve the above problems. The object of the present invention is to raise the salient pole ratio (Lq/Ld) of the synchronous reluctance motor and increase the torque and power factor.

Means for Solving the Problem

According to the present invention, there is provided a synchronous reluctance motor comprising: a rotor shaft which is supported in a rotatable manner and axially extends at a rotation axis; a rotor core on which a plurality of flux barriers are formed and which is fixed to the rotor shaft and extends in the direction of the rotation axis; a stator core which is disposed on an outer periphery of the rotor core in such a way as to form a gap between the rotor core and the stator core and on which a plurality of protruding stator teeth are formed in such a way as to be spaced out in a circumferential direction each other and extend in the direction of the rotation-axis; and multiphase armature windings of a plurality of poles which are wound around the plurality of stator teeth, wherein the flux barriers include a plurality of first flux barriers which are formed in such a way as to be spaced out in the circumferential direction each other and extend in a radial direction, and a plurality of second flux barriers which are formed in each of circumferential angular regions sandwiched between the first flux barriers in such a way as to form a curved surface protruding toward the center of the rotation-axis and to spread and be mutually spaced out in the circumferential direction.

According to the present invention, there is provided a rotor of a synchronous reluctance motor equipped with a stator core including an armature winding, comprising: a rotor shaft which is supported in a rotatable manner and axially extends at a rotation axis; and a rotor core on which a plurality of flux barriers are formed and which is fixed to the rotor shaft and extends in the direction of the rotation axis, wherein the flux barriers include a plurality of first flux barriers which are formed in such a way as to be spaced out in the circumferential direction each other and extend in a radial direction, and a plurality of second flux barriers which are formed in each of circumferential angular regions sandwiched between the first flux barriers in such a way as to form a curved surface convex toward the rotation-axis center and to spread and be spaced out in the circumferential direction each other.

Advantage of the Invention

According to the present invention, it is possible to raise the salient pole ratio (Lq/Ld) of the synchronous reluctance motor and increase the torque and power factor.

EMBODIMENTS FOR CARRYING OUT THE INVENTION

First Embodiment

Figure 1:
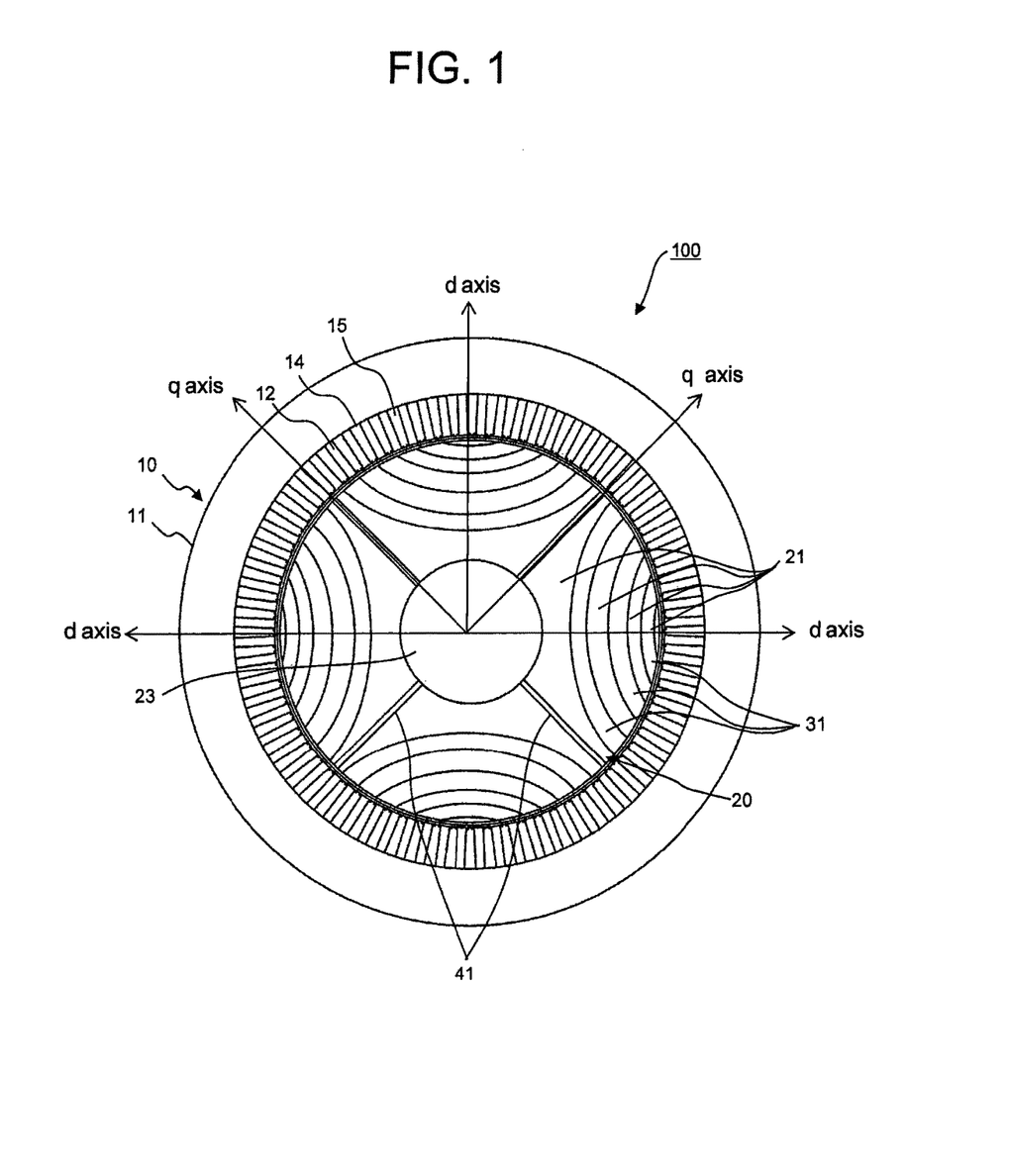
FIG. 1 is a cross-sectional view of a synchronous reluctance motor, which is perpendicular to the direction of a rotation axis, according to a first embodiment.
Figure 2:
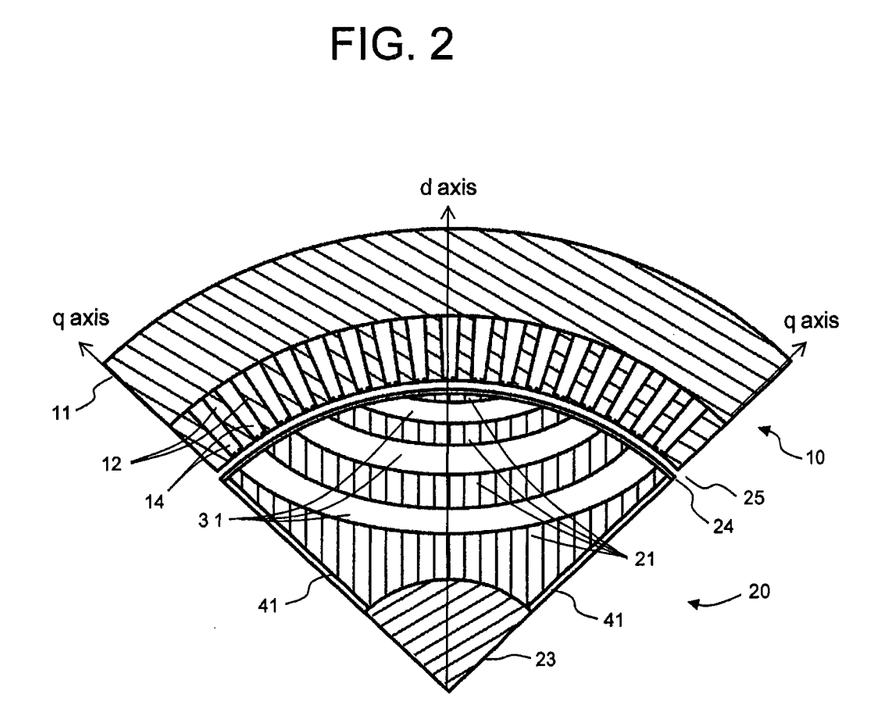
FIG. 2 is a detailed, partial cross-sectional view of the synchronous reluctance motor, which is perpendicular to the direction of the rotation axis, according to the first embodiment.

FIG. 1 is a cross-sectional view of a synchronous reluctance motor, which is perpendicular to the direction of a rotation axis, according to a first embodiment. FIG. 2 is a detailed, partial cross-sectional view of the synchronous reluctance motor, which is perpendicular to the direction of the rotation axis, according to the first embodiment. FIG. 2 is a cross-sectional view of one-fourth of the synchronous reluctance motor. However, FIG. 2 is a diagram showing the one-fourth portion only because of ease of explanation. This does not mean that the synchronous reluctance motor can be divided on a one-fourth basis.

A synchronous reluctance motor 100 includes, in a housing (not shown), a stator 10 and a rotor 20.

The stator 10 includes a stator core 11 and a plurality of stator teeth 12.

The stator core 11 has a structure in which electromagnetic steel sheets, which are thin plates produced by adding silicon to iron, in order to reduce an eddy current loss, are stacked in the direction of a rotation axis. The stator core 11 is cylindrical in shape, extending in a direction of the rotation-axis of a rotor shaft 23.

The stator teeth 12 are arranged on an inner periphery of the stator 10 and are mutually spaced out in a circumferential direction. The stator teeth 12 extend in the direction of the rotation-axis of the rotor shaft 23. Each of the stator teeth 12 protrudes toward a rotation center of the rotor 20 from the side of the stator core 11. The tip of each of the stator teeth 12 faces an outer periphery of the rotor 20 across a radial-direction gap 25.

Between adjacent stator teeth 12, stator slots 14 are formed in such a way as to extend in the direction of the rotation-axis of the rotor shaft 23.

Figure 3:
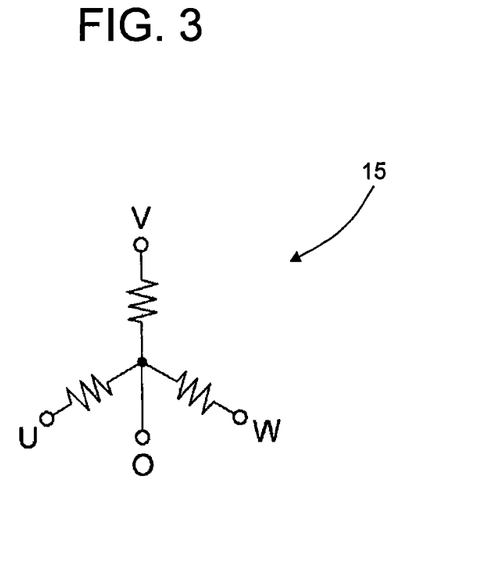
FIG. 3 is a wiring diagram of armature windings of the synchronous reluctance motor according to the first embodiment.

FIG. 3 is a wiring diagram of armature windings of the synchronous reluctance motor according to the first embodiment.

Armature windings 15 are wound around the stator teeth 12 and are housed inside the stator slots 14.

That is, multiphase armature windings 15, for example, three-phase armature windings 15, of a plurality of poles are wound. Through each armature winding 15, AC current of one of U-phase, V-phase, or W-phase flows.

In the synchronous reluctance motor 100, there is no field winding provided.

As shown in FIGS. 1 and 2, on the inner side of the stator 10, the rotor 20 is disposed in such a way as to create space between the rotor 20 and the stator 10. As described above, no field winding is wound around the rotor 20. The rotor 20 includes a rotor core 21 and the rotor shaft 23.

The rotor shaft 23 extends coaxially with the rotation axis. The rotor shaft 23 is supported by bearings (not shown), which are provided in the housing, in a rotatable manner. The bearings may be rolling bearings such as roller bearings or ball bearings, or sliding bearings.

The rotor core 21 has a structure in which electromagnetic steel sheets, which are thin plates produced by adding silicon to iron in order to reduce an eddy current loss, are stacked in the direction of the rotation axis. The rotor core 21, in which the thin plates are stacked, is cylindrical in shape and occupies around the rotor shaft 23 in such a way as to be thick in the radial direction.

In order to keep the mechanical strength of the rotor 20, on an outer peripheral portion of the rotor core 21, a bridge portion 24 is provided.

In the cross section of the rotor 20, the direction of a main magnetic flux is referred to as q-axis, and a direction that is electrically and magnetically orthogonal to that direction is referred to as d-axis. On the rotor core 21, first flux barrier and second flux barrier, which are magnetic barriers extending in the direction of the rotation-axis, are formed.

The first flux barriers are a plurality of q-axis direction flux barriers 41, which are formed in such a way as to be spaced out in the circumferential direction each other, and extend in the radial direction. The q-axis direction flux barriers 41 are formed in such a way as to pierce through each of electromagnetic steel plates that make up the rotor core 21. The q-axis direction flux barriers 41 extend in the radial direction along the q-axis direction.

In each of the steel plates, a plurality of penetration portions are formed for the q-axis direction flux barriers 41.

The second flux barriers are a plurality of d-axis peripheral flux barriers 31 that are provided in each of circumferential-direction angular regions (referred to as circumferential angular regions, hereinafter) sandwiched between adjacent q-axis direction flux barriers 41.

The d-axis peripheral flux barriers 31 mutually spread in the circumferential direction in each of the circumferential angular regions. The d-axis peripheral flux barriers 31 extend toward the rotation axis of the rotor shaft in such a way as to form a convex curved surface. Both ends of the curved surface do not cross the q-axis direction flux barriers 41; the two ends of the curved surface reach the bridge portion 24.

Adjacent d-axis peripheral flux barriers 31 are spaced out in such a way as not to cross or contact each other.

Although not shown in FIGS. 1 and 2, due to the first flux barriers, or q-axis direction flux barriers 41, and the second flux barriers, or d-axis peripheral flux barriers 31, the rotor core 21 appears to be completely divided into pieces. However, the adjacent steel-plate portions of the rotor core 21 between which the q-axis direction flux barriers 41 or d-axis peripheral flux barriers 31 are sandwiched are partially connected to each other, thus making it possible to keep the relative positional relations.

According to the above-described configuration, a rotating magnetic field is generated around the rotation axis of the rotor 20. The rotor 20 is attracted by the rotating magnetic field and rotating around the rotor shaft 23.

Figure 4:
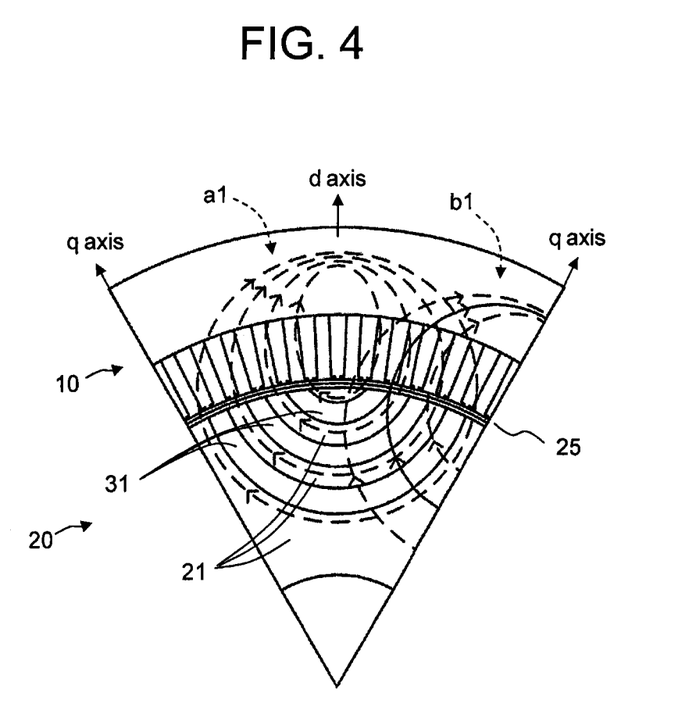
FIG. 4 is a schematic magnetic flux distribution diagram of a cross section of a conventional synchronous reluctance motor, which is perpendicular to the direction of a rotation axis.

FIG. 4 is a schematic magnetic flux distribution diagram of a cross section of a conventional synchronous reluctance motor, which is perpendicular to the direction of a rotation axis. In this case, in the conventional synchronous reluctance motor, q-axis direction flux barriers 41 are not provided. That is, FIG. 4 shows a magnetic flux distribution when there are no q-axis direction flux barriers 41. The diagram shows the magnetic flux distribution of a one-sixth section of the rotor 20.

In FIG. 4, broken line a1 represents q-axis magnetic fluxes, with major magnetic fluxes traveling along q-axis. Meanwhile, b1 represents d-axis magnetic fluxes, with major magnetic fluxes traveling along d-axis.

In the synchronous reluctance motor 100, the rotor 20 rotates at the same angular velocity as the rotating magnetic field. Therefore, on the rotor 20, the positions of those magnetic fluxes remain unchanged, and the magnetic fluxes stay at the same positions. That is, when viewed from a stationary system, those magnetic fluxes rotate at the same angular velocity as the rotor 20.

On the rotor 20, a-axis magnetic fluxes pass through each of portions of the rotor core 21 that are divided by d-axis peripheral flux barriers 31. Moreover, q-axis magnetic fluxes enter the side of the stator 10 after passing through a gap 25 between the stator 10 and the rotor 20. The magnetic fluxes within the rotor 20 and the magnetic fluxes passing through the stator 10 form a closed loop as a whole, and form magnetic fluxes traveling along q-axis in the vicinity of q-axis.

Meanwhile, magnetic fluxes b1 are connected to magnetic fluxes in an adjacent one-sixth section, which is not shown in FIG. 4. As shown in FIG. 4, magnetic fluxes b1 form magnetic fluxes traveling along the d-axis direction in the vicinity of d-axis.

Figure 5:
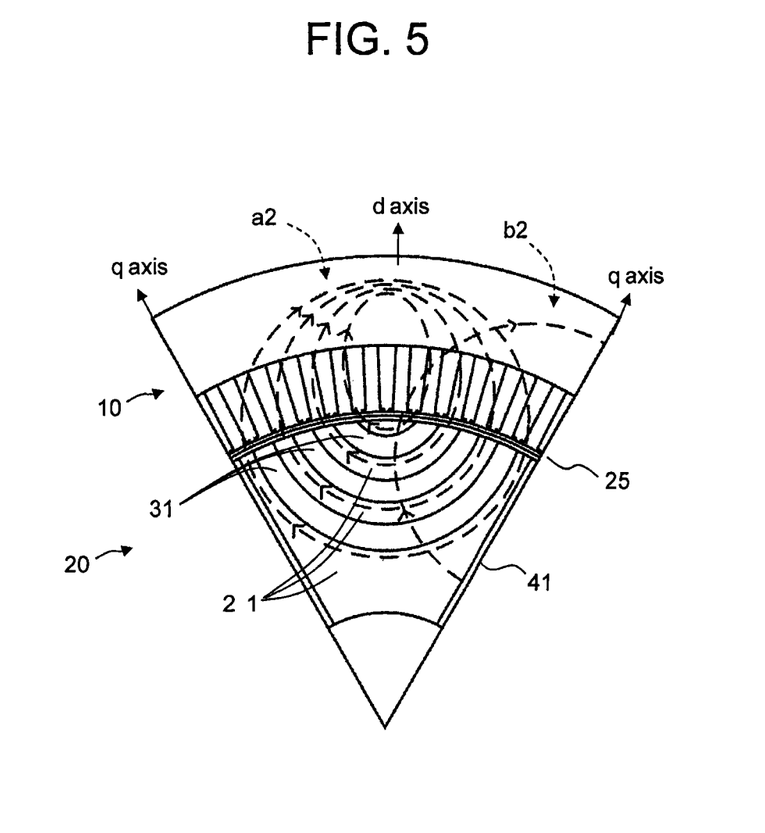
FIG. 5 is a schematic magnetic flux distribution diagram of a cross section of the synchronous reluctance motor of the first embodiment, which is perpendicular to the direction of the rotation axis.

FIG. 5 is a schematic magnetic flux distribution diagram of a cross section of the synchronous reluctance motor of the first embodiment, which is perpendicular to the direction of the rotation axis. That is, the diagram shows a magnetic flux distribution when the q-axis direction flux barriers 41 are provided.

In FIG. 5, broken line a2 represents q-axis magnetic fluxes, with major magnetic fluxes traveling along q-axis. Meanwhile, b2 represents d-axis magnetic fluxes, with major magnetic fluxes traveling along d-axis.

According to the present embodiment, on paths of d-axis magnetic fluxes, the a-axis direction flux barriers 41 exist. The q-axis direction flux barriers 41 are air layers, and are smaller in permeability than the steel-plate portions of the rotor core 21. As a result, the existence of the q-axis direction flux barriers 41 makes it difficult for d-axis magnetic fluxes to pass therethrough.

The magnetic flux lines are being shown qualitatively. Based on the number of q-axis magnetic flux lines, d-axis magnetic flux lines are shown. Accordingly, it is assumed that the number of magnetic flux lines of q-axis magnetic fluxes shown in FIG. 4 is equal to the number of magnetic flux lines of q-axis magnetic fluxes shown in FIG. 5.

When d-axis magnetic fluxes b1 in FIG. 4 are compared with d-axis magnetic fluxes b2 in FIG. 5, the number of magnetic flux lines of d-axis magnetic fluxes b2 in FIG. 5 is smaller than the number of magnetic flux lines of d-axis magnetic fluxes b1 in FIG. 4. That is, the percentage of d-axis magnetic fluxes relative to q-axis magnetic fluxes in the present embodiment shown in FIG. 5 is smaller than the percentage of d-axis magnetic fluxes relative to q-axis magnetic fluxes in the conventional structure shown in FIG. 4.

The conventional SynRM has been configured in such a way as to make the passage of d-axis magnetic fluxes more difficult than that of q-axis magnetic fluxes. However, according to the present embodiment, the q-axis direction flux barriers 41 are provided. Therefore, the d-axis magnetic fluxes face much more difficulty in passing than the q-axis magnetic fluxes.

As a result, compared with q-axis direction self-inductance, or q-axis inductance Lq, d-axis direction self-inductance, or d-axis inductance Ld, becomes further smaller. That is, salient pole ratio Lq/Ld increases further.

Figure 6:
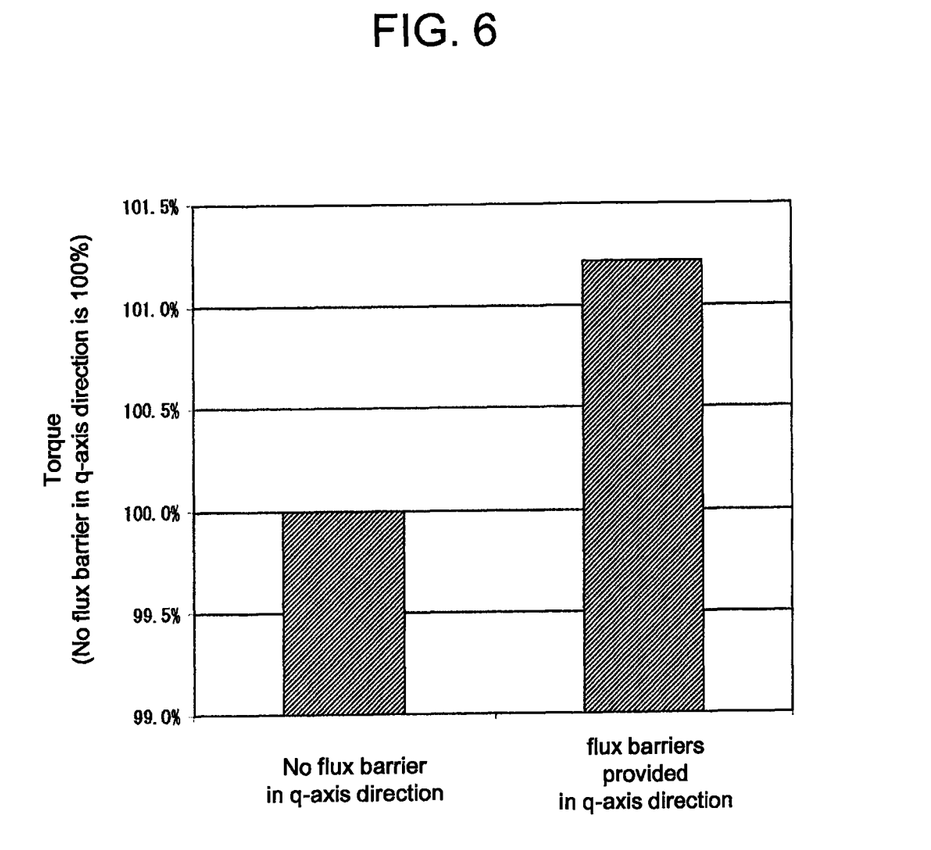
FIG. 6 is a comparison diagram of average rotor shaft torque of the conventional synchronous reluctance motor and synchronous reluctance motor of the first embodiment.

FIG. 6 is a comparison diagram of average rotor shaft torque of the conventional synchronous reluctance motor and synchronous reluctance motor of the first embodiment.

The q-axis direction inductance of the rotor 20, or q-axis inductance, is represented by 14. The d-axis direction inductance, or d-axis inductance, is represented by Ld. The q-axis direction component of current flowing through the rotor core 21 is represented by Iq, and the d-axis direction component by Id. In this case, the reluctance torque is gained as $(Ld-Lq) \cdot Id \cdot Iq$. That is, as the difference between Ld and Lq becomes larger, the reluctance torque increases.

As shown in FIG. 6, the torque of the synchronous reluctance motor of the present embodiment is significantly larger, or about 1% larger, than the torque of the conventional synchronous reluctance motor.

Figure 7:
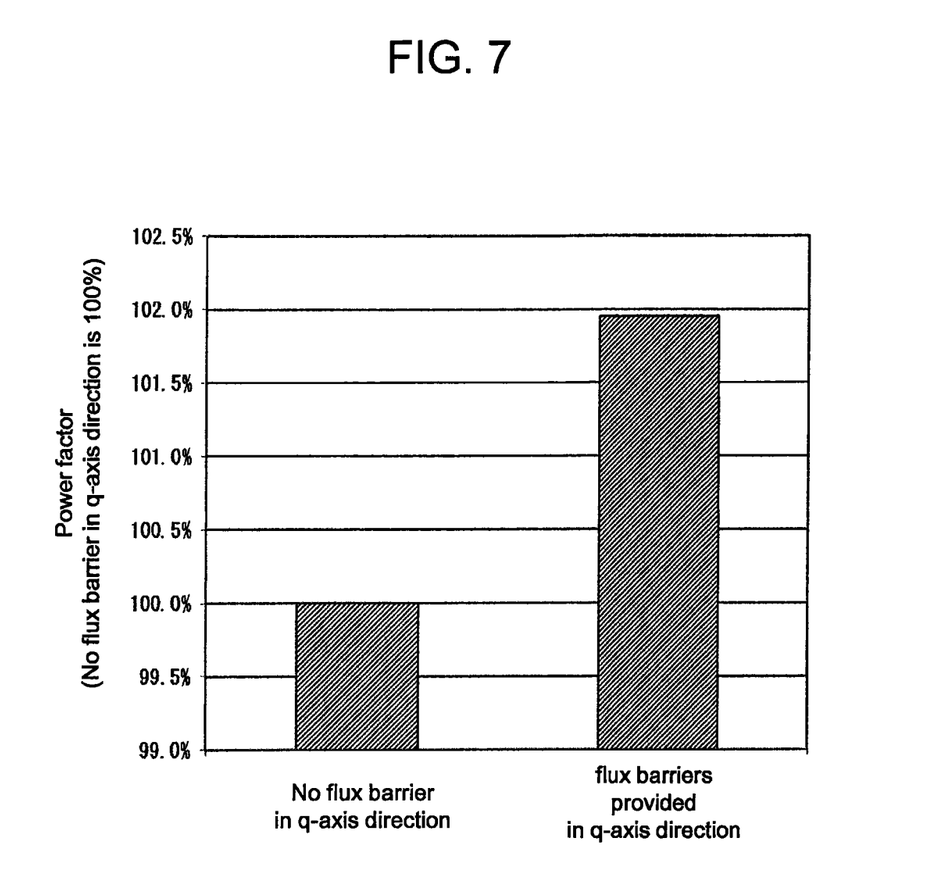
FIG. 7 is a comparison diagram of the power factors of the conventional synchronous reluctance motor and synchronous reluctance motor of the first embodiment.

FIG. 7 is a comparison diagram of the power factors of the conventional synchronous reluctance motor and synchronous reluctance motor of the first embodiment.

As shown in FIG. 7, the power factor of the synchronous reluctance motor of the present embodiment is about 2% larger than the power factor of the conventional synchronous reluctance motor. In this manner, the power factor has been significantly improved.

As described above, according to the present embodiment, the salient pole ratio (Lq/Ld) of the synchronous reluctance motor becomes larger. Therefore, it is possible to increase the torque and power factor.

Second Embodiment

Figure 8:
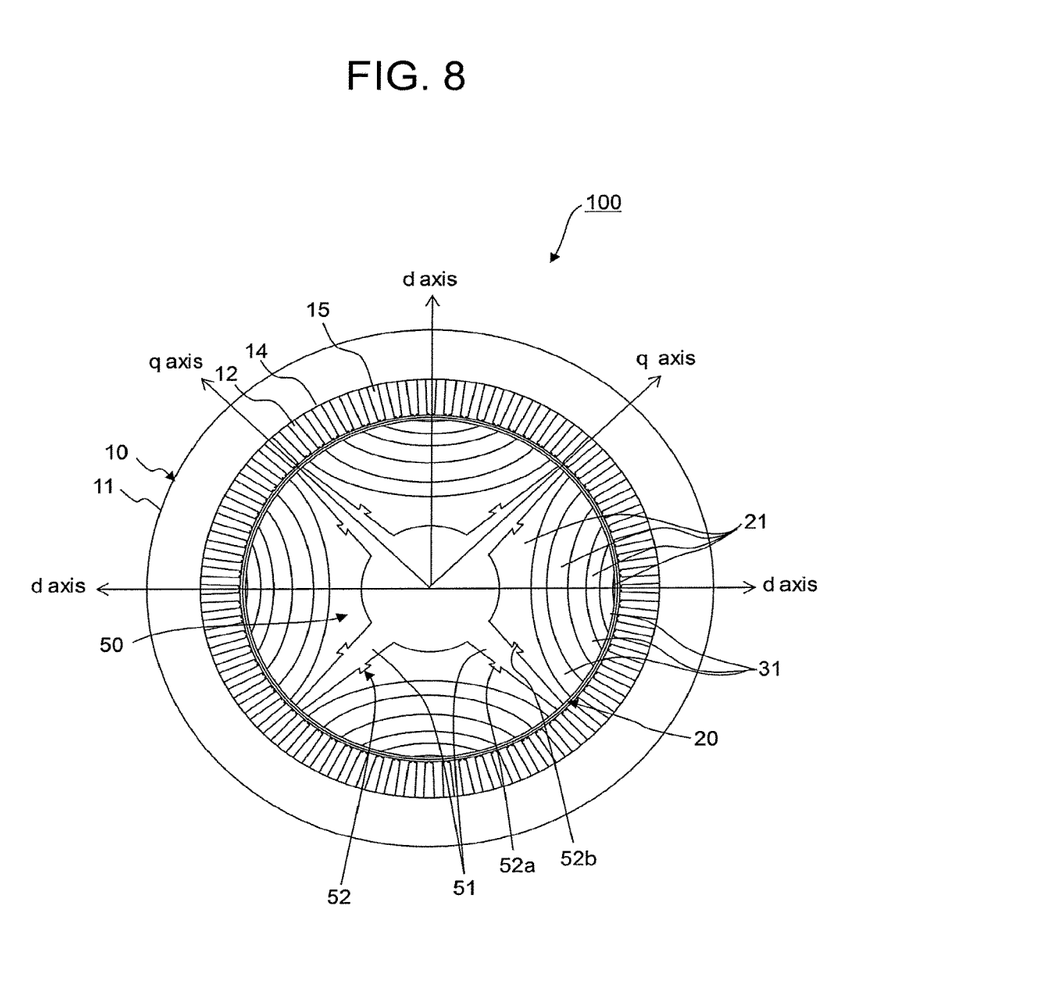
FIG. 8 is a cross-sectional view of a synchronous reluctance motor of a second embodiment, which is perpendicular to the direction of a rotation axis.

FIG. 8 is a cross-sectional view of a synchronous reluctance motor of a second embodiment, which is perpendicular to the direction of a rotation axis. The present embodiment is a variant of the first embodiment.

A star-shaped rotor shaft 50 includes four radial plates 51, which extend toward a radial-direction outer side. The four radial plates 51 are arranged in such a way as to be spaced out in a circumferential direction and extend in the direction of a rotation axis of the rotor 20. What is shown here is the four radial plates 51. However, the number of radial plates 51 is not limited to four. A plurality of radial plates 51, e.g., six radial plates 51, may be provided.

The radial plates 51 of the second embodiment are disposed in regions corresponding to where the q-axis direction flux barriers 41 are formed in the first embodiment. The star-shaped rotor shaft 50 is made of nonmagnetic material. Accordingly, as in the case of the q-axis direction flux barriers 41 of the first embodiment, the radial plates 51 is high in magnetic resistance, and does not allow a magnetic flux to easily pass therethrough.

On both sides of each radial plate 51, dovetail shaped projections (52a) are formed in such a way as to extend in the direction of the rotation-axis and protrude in the circumferential direction. On the rotor core 21, fitting portions 52 in which grooves (52b) are formed in such a way as to fit onto the dovetail shaped projections (52a) are provided. Since the radial plates 51 are fitted into the rotor core 21, a positional shift between the radial plates 51 and the rotor core 21 does not occur.

What are shown here are the fitting portions 52 that are dovetail-shaped. However, the fitting portions 52 are not limited to be dovetail-shaped. The fitting portions 52 may be rectangular or triangular in shape, for example.

What is shown here is that, in the fitting portions 52, the sides of the radial plates 51 are convex, and the side of the rotor core 21 is concave. Instead, grooves may be formed on side surfaces of the radial plates 51, and projections may be formed on the side of the rotor core 21.

According to the present embodiment, which is configured as described above, the radial plates 51 of the star-shaped rotor shaft 50 act in the same way as the q-axis direction flux barriers of the first embodiment. Therefore, the salient pole ratio (Lq/Ld) becomes larger than that of the conventional synchronous reluctance motor, thereby increasing the torque and power factor.

Moreover, by employing the rotor shaft 23 with the side of the radial plates 51 that include the fitting portions 52 with the rotor core 21, it is possible to improve the mechanical strength of the rotor 20, as well as to further strengthen the fixation of the rotor core 21.

Third Embodiment

Figure 9:
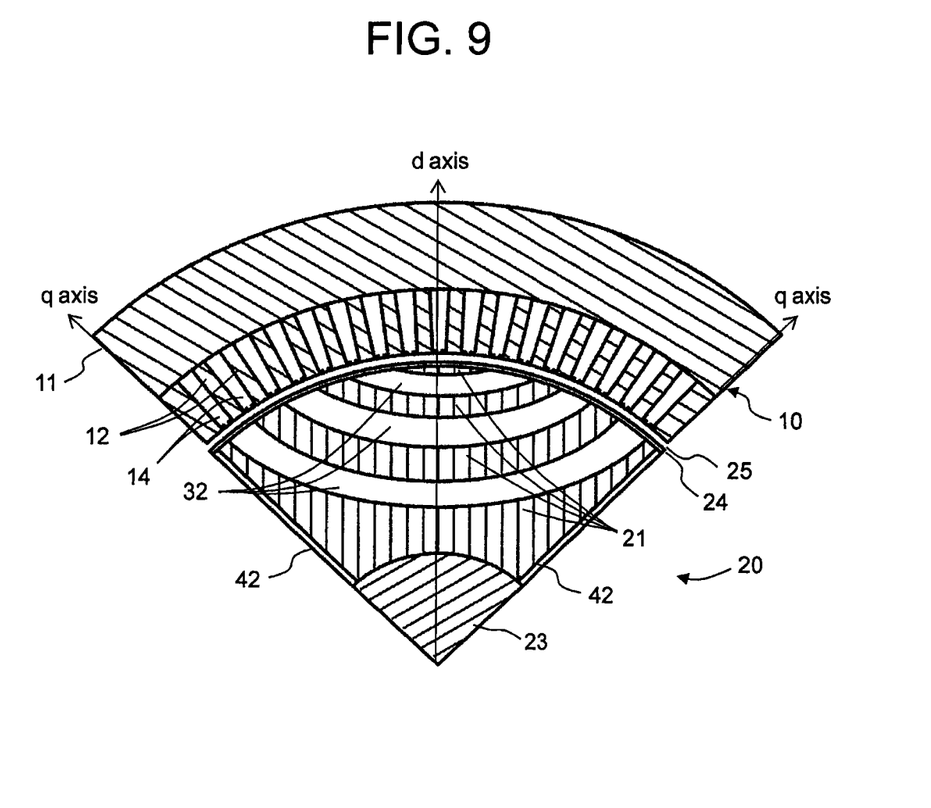
FIG. 9 is a partial cross-sectional view showing details of a cross section of a synchronous reluctance motor of a third embodiment, which is perpendicular to the direction of a rotation axis.

FIG. 9 is a partial cross-sectional view showing details of a cross section of a synchronous reluctance motor of a third embodiment, which is perpendicular to the direction of a rotation axis. The present embodiment is a variant of the first embodiment.

According to the first embodiment, the d-axis peripheral flux barriers 31 and the a-axis direction flux barriers 41 are air layers. In the case of the third embodiment, d-axis peripheral flux barriers 32 and a-axis direction flux barriers 42 are filled with nonmagnetic-material resin.

According to the present embodiment, which is configured as described above, there is nonmagnetic-material resin inside the d-axis peripheral flux barriers 32 and q-axis direction flux barriers 42. Therefore, it is possible to form magnetic barriers, as in the case of the first embodiment.

Accordingly, the q-axis direction flux barriers 42 act in the same way as the q-axis direction flux barriers 41 of the first embodiment. Therefore, the salient pole ratio (Lq/Ld) becomes larger, increasing the torque and power factor.

Moreover, the d-axis peripheral flux barriers 32 and the q-axis direction flux barriers 42 are both filled with resin. Therefore, it is possible to secure the mechanical strength of the rotor core 21.

What is described in the present embodiment is the case where both the d-axis peripheral flux barriers 32 and the q-axis direction flux barriers 42 are filled with nonmagnetic-material resin. However, the present invention is not limited to this.

For example, only either the d-axis peripheral flux barriers 32 or the q-axis direction flux barriers 42, or a portion that should be desirably reinforced in terms of structural strength, may be filled with nonmagnetic-material resin.

Alternatively, only portions of the d-axis peripheral flux barriers 32 may be filled with nonmagnetic-material resin.

Third Embodiment

Figure 10:
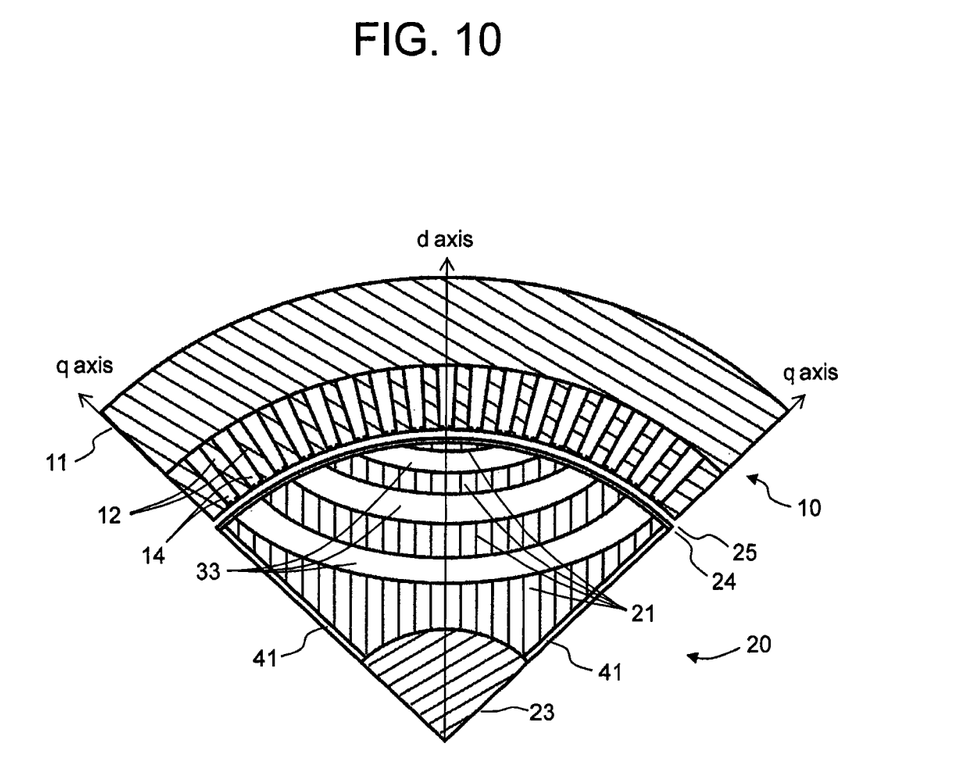
FIG. 10 is a partial cross-sectional view showing details of a cross section of a synchronous reluctance motor of a fourth embodiment, which is perpendicular to the direction of a rotation axis. The present embodiment, too, is a variant of the first embodiment.

FIG. 10 is a partial cross-sectional view showing details of a cross section of a synchronous reluctance motor of a fourth embodiment, which is perpendicular to the direction of a rotation axis. The present embodiment, too, is a variant of the first embodiment.

According to the first embodiment, the d-axis peripheral flux barriers 31 and the q-axis direction flux barriers 41 are air layers. In the case of the fourth embodiment, d-axis peripheral permanent magnets 33, which are permanent magnets, are provided as d-axis peripheral flux barriers.

According to the present embodiment, which is configured described above, the d-axis peripheral flux barriers are permanent magnets 33. Therefore, it is possible to form magnetic barriers, as in the case of the first embodiment.

Moreover, the q-axis direction flux barriers 41 are air layers, and act in the same way as in the first embodiment. Therefore, the salient pole ratio (Lq/Ld) becomes larger, increasing the torque and power factor.

What is described in the present embodiment is the case where permanent magnets are provided in the vicinity of d-axis. However, the present invention is not limited to this.

For example, permanent magnets may be provided both in the vicinity of d-axis and in the direction of q-axis; or permanent magnets may be provided only in portions around d-axis.

Other Embodiments

The present invention is described above by way of several embodiments. However, the embodiments are presented only as examples without any intention of limiting the scope of the present invention.

The features of each embodiment may be used in combination. For example, the star-shaped rotor shaft 51, which is a feature of the second embodiment, may be used in combination with the flux barriers filled with nonmagnetic-material resin, which are a feature of the third embodiment.

Instead, the star-shaped rotor shaft 50, which is a feature of the second embodiment, may be used in combination with the installment of permanent magnets, which is a feature of the fourth embodiment.

Furthermore, the above-described embodiment may be put to use in various different ways and, if appropriate, any of the components thereof may be omitted, replaced or altered in various different ways without departing from the spirit and scope of the invention.

Therefore, all the above-described embodiments and the modifications made to them are within the spirit and scope of the present invention, which is specifically defined by the appended claims, as well as their equivalents.

EXPLANATION OF REFERENCE SYMBOLS

10: stator, 11: stator core, 12: stator teeth, 14: stator slots, 15: armature winding, 20: rotor, 21: rotor core, 23: rotor shaft, 24: bridge portion, 25: gap, 31,32: d-axis peripheral flux barrier, 33: permanent magnet, 41,42: q-axis direction flux barrier, 50: star-shaped rotor shaft, 51: radial plate, 52: fitting portion, 52*a*: projection, 52*b*: groove, 100: synchronous reluctance motor

The invention claimed is:

1. A synchronous reluctance motor comprising:
a rotor shaft which is supported in a rotatable manner and axially extends at a rotation axis;
a rotor core shaped in a cylindrical form including a bridge portion on an outer peripheral portion thereof, on which a plurality of flux barriers are formed and which is disposed at outer circumference of the rotor shaft and fixed to the rotor shaft and extends in the direction of the rotation axis;
a stator core which is disposed on an outer periphery of the rotor core in such a way as to form a gap between the rotor core and the stator core and on which a plurality of protruding stator teeth are formed in such a way as to be spaced out in a circumferential direction each other and extend in the direction of the rotation-axis; and
multiphase armature windings of a plurality of poles which are wound around the plurality of stator teeth, wherein
the flux barriers include
a plurality of first flux barriers which are formed in such a way as to be spaced out in the circumferential direction each other and extend in a radial direction, and
a plurality of second flux barriers which are formed in each of circumferential angular regions sandwiched between the first flux barriers in such a way as to form a curved surface protruding toward the center of the rotation-axis and to spread and be mutually spaced out in the circumferential direction,
the rotor shaft includes a plurality of radial plates which are made of nonmagnetic material, are spaced out in the circumferential direction, and which extend toward a radial-direction outer side, extend in the direction of the rotation-axis and are disposed in the first flux barriers, and
projections are formed at least in one of the rotor core and the radial plates and grooves are formed in the other for mutual fitting.

2. The synchronous reluctance motor according to claim 1, wherein
the projections for fitting are dovetail-shaped.

3. The synchronous reluctance motor according to claim 1, wherein
at least the first flux barriers or the second flux barriers are filled with nonmagnetic resin.

4. The synchronous reluctance motor according to claim 1, wherein
air layers are formed in at least the first flux barriers or the second flux barriers.

5. The synchronous reluctance motor according claim 1, wherein
permanent magnets are disposed in at least the first flux barriers or the second flux barriers.

6. A rotor of a synchronous reluctance motor equipped with a stator core including an armature winding, comprising:
a rotor shaft which is supported in a rotatable manner and axially extends at a rotation axis; and
a rotor core shaped in a cylindrical form including a bridge portion on an outer peripheral portion thereof, on which a plurality of flux barriers are formed and which is disposed at an outer circumference of the rotor shaft and fixed to the rotor shaft and extends in the direction of the rotation axis, wherein
the flux barriers include
a plurality of first flux barriers which are formed in such a way as to be spaced out in the circumferential direction each other and extend in a radial direction, and
a plurality of second flux barriers which are formed in each of circumferential angular regions sandwiched between the first flux barriers in such a way as to form a curved surface convex toward the rotation-axis center and to spread and be spaced out in the circumferential direction each other,
the rotor shaft includes a plurality of radial plates which are made of nonmagnetic material, are spaced out in the circumferential direction, and which extend toward a radial-direction outer side, extend in the direction of the rotation-axis and are disposed in the first flux barriers and,
projections are formed at least in one of the rotor core and the radial plates and grooves are formed in the other for mutual fitting.

* * * * *